(12) United States Patent
Hayama

(10) Patent No.: US 10,001,585 B2
(45) Date of Patent: Jun. 19, 2018

(54) ILLUMINATING DEVICE

(71) Applicant: Empire Technology Development LLC, Wilmington, DE (US)

(72) Inventor: Hidekazu Hayama, Osaka (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1111 days.

(21) Appl. No.: 13/992,218

(22) PCT Filed: Dec. 3, 2012

(86) PCT No.: PCT/JP2012/007743
§ 371 (c)(1),
(2) Date: Jun. 6, 2013

(87) PCT Pub. No.: WO2014/087445
PCT Pub. Date: Jun. 12, 2014

(65) Prior Publication Data
US 2014/0153215 A1    Jun. 5, 2014

(51) Int. Cl.
*G02B 1/04*    (2006.01)
*F21V 8/00*    (2006.01)
*B29D 11/00*    (2006.01)

(52) U.S. Cl.
CPC ........ *G02B 1/045* (2013.01); *B29D 11/00663* (2013.01); *G02B 6/0003* (2013.01); *G02B 6/0035* (2013.01); *G02B 6/0068* (2013.01)

(58) Field of Classification Search
CPC ............................ G02B 6/0003; G02B 6/0068
See application file for complete search history.

(56) References Cited

U.S. PATENT DOCUMENTS

| 5,557,702 A | 9/1996 | Yoshikawa et al. |
| 7,108,416 B1 | 9/2006 | Osawa |
| 2006/0001036 A1* | 1/2006 | Jacob ................... G02B 6/0003 257/98 |
| 2006/0002101 A1* | 1/2006 | Wheatley ............. G02B 6/0003 362/84 |
| 2006/0072339 A1 | 4/2006 | Li et al. |
| 2007/0132366 A1* | 6/2007 | Yabe ...................... C09K 11/06 313/501 |

FOREIGN PATENT DOCUMENTS

| JP | 2003036714 A | 2/2003 |
| JP | 200585718 A | 3/2005 |

(Continued)

OTHER PUBLICATIONS

Machine Translation of JP 2010017305, no date.*
International Search Report and Written Opinion for PCT/JP2012/007743, filed Dec. 3, 2012, dated Mar. 6, 2013.

*Primary Examiner* — Alex A Rolland

(57) ABSTRACT

An illuminating device is configured to include a light guide structure having a first light source configured to emit light of a first wavelength to excite at least one red fluorescent transparent substance; a second light source configured to emit light of a second wavelength to excite at least one green fluorescent transparent substance; and a third light source configured to emit light of a third wavelength to excite at least one blue fluorescent transparent substance.

16 Claims, 5 Drawing Sheets

(56) References Cited

FOREIGN PATENT DOCUMENTS

| | | | |
|---|---|---|---|
| JP | 2006108076 | A | 4/2006 |
| JP | 200739564 | A | 2/2007 |
| JP | 201017335 | A | 1/2010 |
| JP | 2010017305 | A * | 1/2010 |
| JP | 201027452 | A | 2/2010 |
| JP | 2011040664 | A | 2/2011 |

* cited by examiner

[Fig. 1]
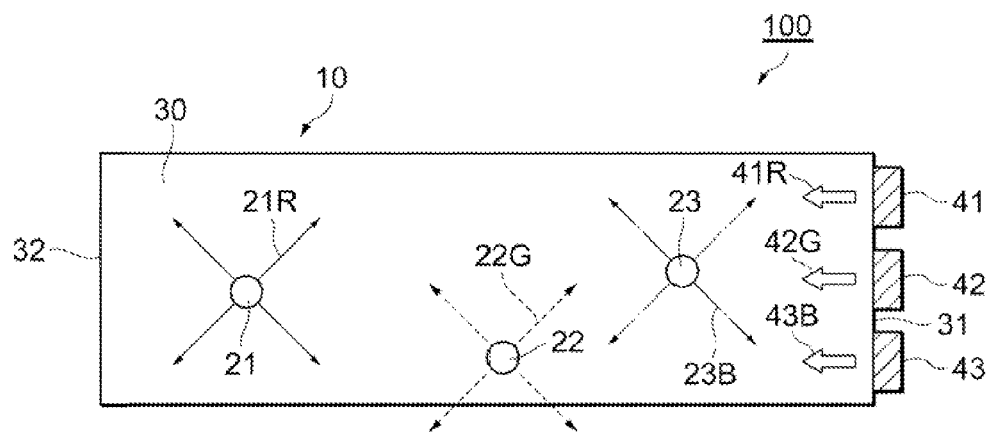
[Fig. 2]
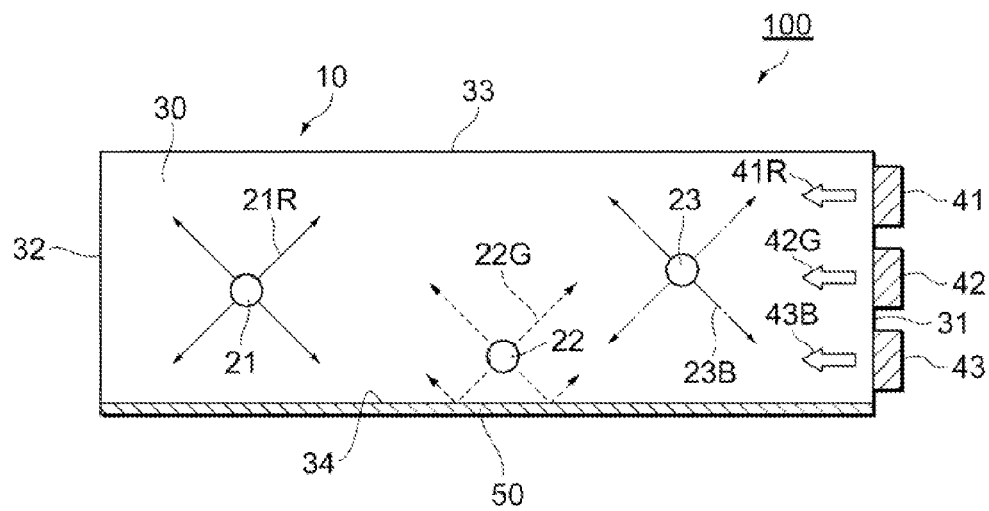

[Fig. 3]
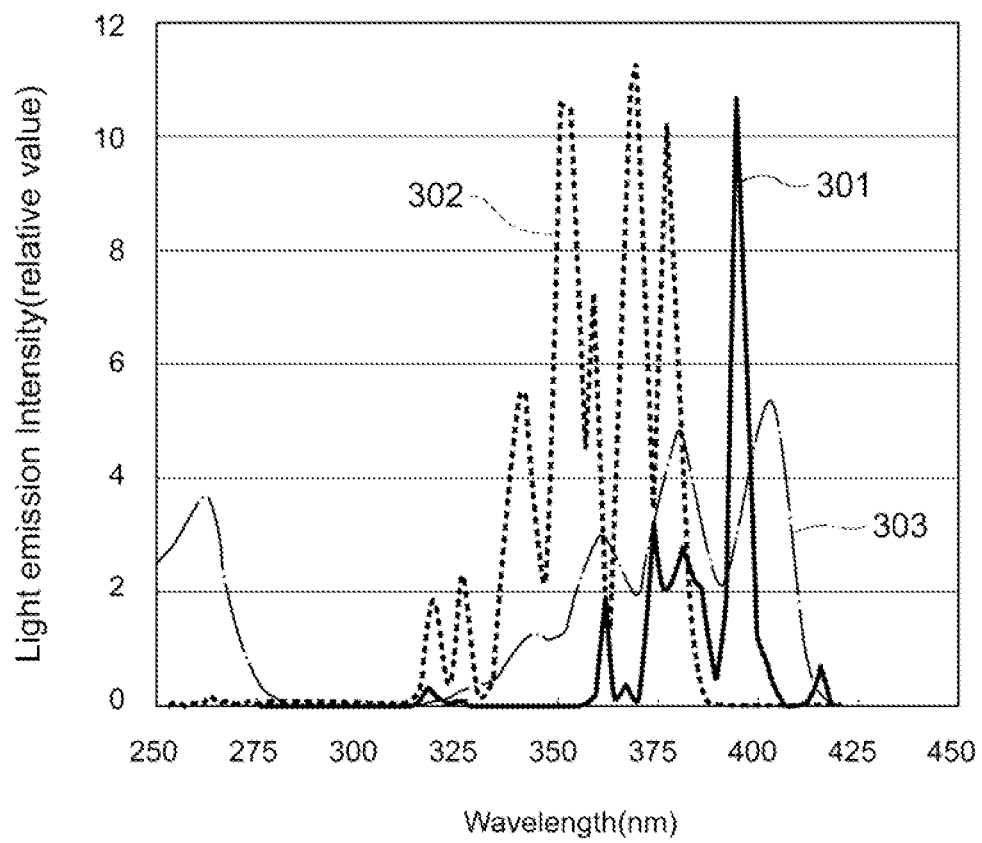

[Fig. 4]
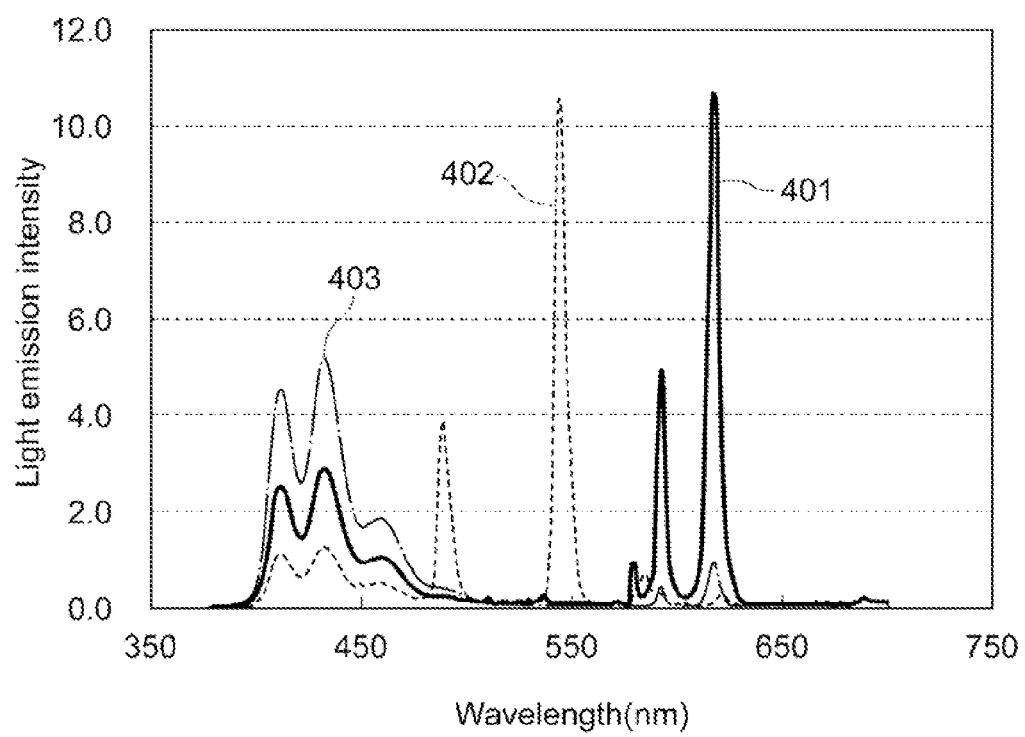

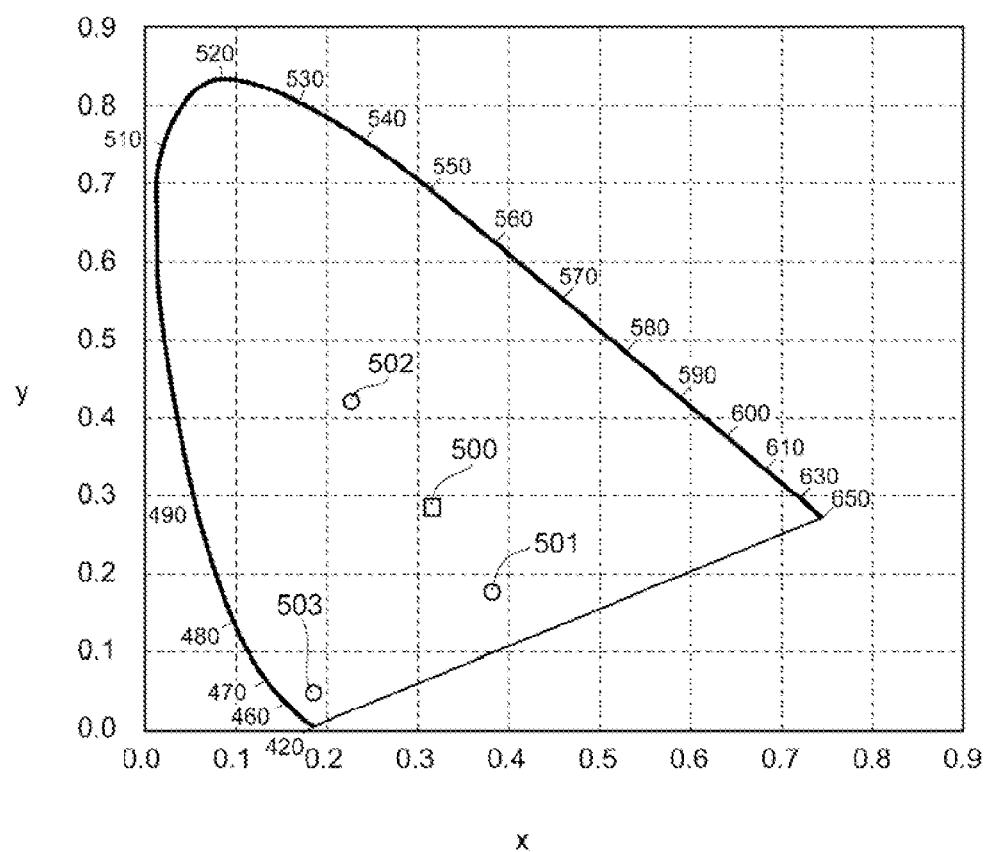
[Fig. 5]

[Fig. 6]
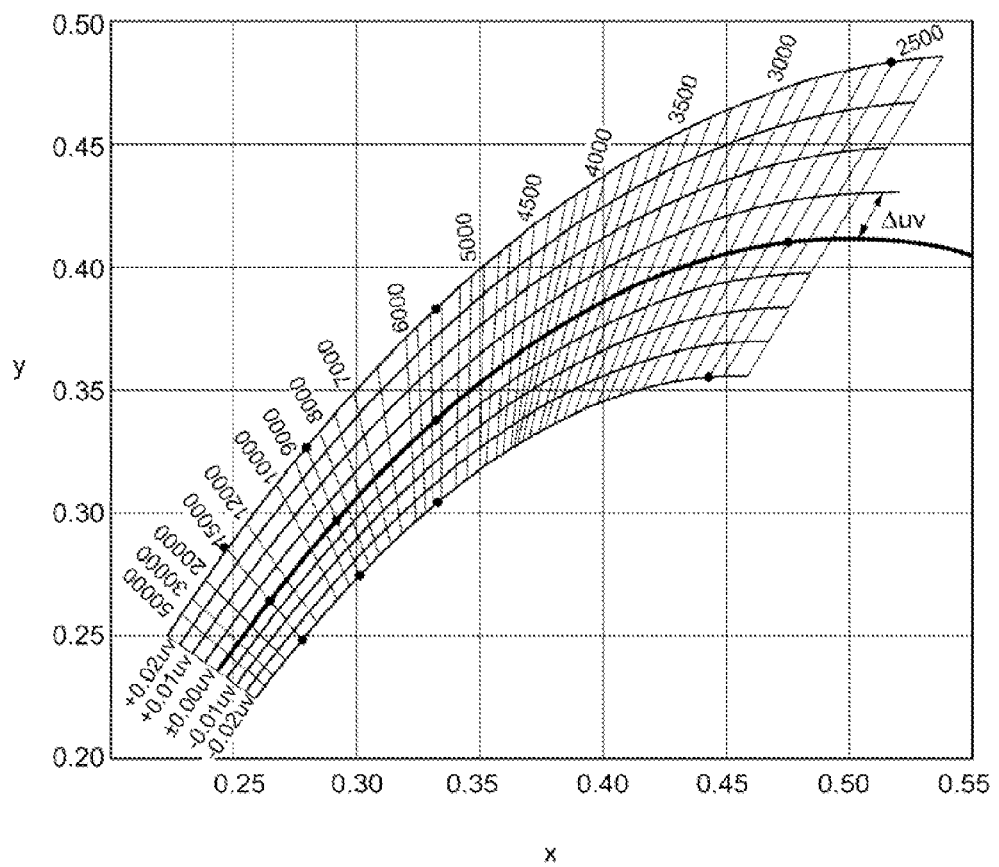

ILLUMINATING DEVICE

CROSS-REFERENCE TO RELATED APPLICATION

This Application is the National Stage filing under 35 U.S.C § 371 of PCT Application Ser. No. PCT/JP 2012/007743 filed on Dec. 3, 2012. The disclosure of the PCT Application is herein incorporated by reference in its entirety.

BACKGROUND

Reflective displays, such as liquid crystal displays, require a light guide structure to emit white light toward their display panel. One conventional light guide structure is configured such that yellow fluorescent substances are excited by blue light emitted from a blue light-emitting diode ("LED"). This structure mixes yellow light from the yellow fluorescent substances with the blue light from the blue LED to produce white light. In this conventional structure, it is difficult to find to proper balance between the blue light and the yellow light. This can easily result in color unevenness. Another problem with this conventional structure is low color purity, because the produced white light is pseudo white light based on the combination of the blue light and the yellow light. Yet another problem is that it is not possible to freely change an emission intensity of the pseudo white light, nor is it possible to make the pseudo white light have various colors. A still further problem is that when the yellow fluorescent substances are not transparent, the non-transparent fluorescent substances act as scattering particles. This makes it difficult to propagate excited light within the light guide structure from an edge of one side to an edge of an opposite side. Given these circumstances, expectations for a light guide structure configured to emit white light with a high level of color purity have increased in recent times.

SUMMARY

In accordance with one embodiment, an illuminating device configured to emit white light with a high level of color purity is provided. This illuminating device includes a light guide structure having a transparent member containing at least one red fluorescent transparent substance, at least one green fluorescent transparent substance, and at least one blue fluorescent transparent substance; a first light source configured to emit light of a first wavelength to excite the at least one red fluorescent transparent substance; a second light source configured to emit light of a second wavelength to excite the at least one green fluorescent transparent substance; and a third light source configured to emit light of a third wavelength to excite the at least one blue fluorescent transparent substance.

In accordance with another embodiment, a light guide structure is provided. This light guide structure includes a transparent member containing at least one red fluorescent transparent substance capable of being excited at a first excitation wavelength, at least one green fluorescent transparent substance capable of being excited at a second excitation wavelength, and at least one blue fluorescent transparent substance capable of being excited at a third excitation wavelength.

In accordance with yet another embodiment, a method of manufacturing a transparent fluorescent substance for white light emission is provided.

BRIEF DESCRIPTION OF DRAWINGS

FIG. 1 shows a schematic view of an illuminating device in accordance with an embodiment of the present disclosure.

FIG. 2 shows a schematic view of an illuminating device in accordance with an embodiment of the present disclosure.

FIG. 3 shows excitation spectra of red, green, and blue fluorescent transparent substances in accordance with an embodiment of the present disclosure.

FIG. 4 shows light emission spectra of an illuminating device in accordance with an embodiment of the present disclosure.

FIG. 5 shows a chromaticity diagram of light emission from an illuminating device in accordance with an embodiment of the present disclosure.

FIG. 6 shows a black body radiation curve used for defining white color in accordance with an embodiment of the present disclosure.

DETAILED DESCRIPTION

In the following detailed description, reference is made to the accompanying drawings, which form a part hereof. In the drawings, similar symbols typically identity similar components, unless context dictates otherwise. Further, the drawings are intended to be explanatory and may not be drawn to scale. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 shows a schematic view of an illuminating device 100 in accordance with an embodiment of the present disclosure. The illuminating device 100 may be provided with a light guide structure 10 having a transparent member 30 containing at least one red fluorescent transparent substance 21, at least one green fluorescent transparent substance 22, and at least one blue fluorescent transparent substance 23. The illuminating device 100 may further be provided with as first light source 41 configured to emit light 41R of as first wavelength to excite the at least one red fluorescent transparent substance 21; a second light source 42 configured to emit light 42G of a second wavelength to excite the at least one green fluorescent transparent substance 22; and a third light source 43 configured to emit light 43B of a third wavelength to excite the at least one blue fluorescent transparent substance 23. Here, the fluorescent transparent substances 21, 22, and 23 may have different peak excitation wavelengths. In other words, the first, second, and third wavelengths may be different from one another.

The red, green, and blue fluorescent transparent substances 21, 22, and 23 may be uniformly combined throughout the transparent member 30 so that the transparent member 30 can emit white light in response to the light 41R, 42G, and 43B of the first, second, and third wavelengths. With this structure, a combination of red light 21R emitted from the red fluorescent transparent substance 21, green light 22G emitted from the green fluorescent transparent substance 22, and blue light 23B emitted from the blue fluorescent transparent substance 23 can produce the white light with superior color purity. Due to the red, green, and blue fluorescent transparent substances 21, 22, and 23 being uniformly mixed throughout the transparent member 30, the light guide structure 10 can emit the white light having a substantially uniform luminance distribution.

The first, second, and third light sources 41, 42, and 43 may be arranged on one side edge 31 of the transparent member 30. The light guide structure 10 may guide the light 41R, 42G, and 43B from the side edge 31 to an opposite side edge 32 thereof. Due to the red, green, and blue fluorescent transparent substances 21, 22, and 23 being transparent, the light 41R, 42G, and 43B can propagate from the side edge 31 to the opposite side edge 32 through the transparent member 30 without being scattered by the red, green, and blue fluorescent transparent substances 21, 22, and 23. The first, second, and third light sources 41, 42, and 43 may be light sources having a narrow emission spectrum, such as LEDs. Although ultraviolet light sources, such as a mercury lamp, a xenon lamp, and a metal halide lamp, are known as having a broad emission spectrum, if their broad emission spectrum can be modified so as to be narrower by using an optical element, such as a bandpass filter, to diffracting grating, or as prism, these light sources can be used as the first, second, and third light sources 41, 42, and 43. Typically, LEDs tend to have a cost advantage over other light sources.

In one non-limiting, aspect of the present disclosure, fluorescent substances such as those having a narrow excitation spectrum (e.g., rare-earth complexes or fluorescent organic dyes) may be used for the red, green, and blue fluorescent transparent substances 21, 22, and 23.

As a non-limiting example, europium complexes may be used for the red fluorescent transparent substance 21. For ligands coordinated to europium ions, chemical compounds having a phosphate group, such as trimethyl phosphate, triethyl phosphate, tri-n-butyl phosphate, triphenyl phosphate, or tritolyl phosphate may be used. For the purpose of improving the luminous efficiency of the red fluorescent transparent substance 21, tri-n-butyl phosphate may be used as the ligand having a phosphate group.

As a non-limiting example, terbium complexes may be used for the green fluorescent transparent substance 22. For ligands coordinated to terbium ions, chemical compounds having a phosphate group, such as trimethyl phosphate, triethyl phosphate, tri-n-butyl phosphate, triphenyl phosphate, or tritolyl phosphate may be used. For the purpose of improving the luminous efficiency of the green fluorescent transparent substance 22, tri-n-butyl phosphate may be used as the ligand having a phosphate group.

As a non-limiting example, a fluorescent organic dye, such as dibromoanthracene, which has a small Stokes shift, can be used for the blue fluorescent transparent substance 23, because there is a small difference between an excitation wavelength of the blue fluorescent transparent substance 23 and an emission wavelength of the blue fluorescent transparent substance 23. Besides the above, bis-(triazinylamino-) stil-benedisulfonic acid derivative, bis biphenyl derivative, 9,10-Dibrmanthrace, bis-(triazinylamino-)stilbenedisulfonic acid derivative, bis stilbiphenyl derivative, 2,5-bis(5-tert-butyl-2-benzoxazolyl)thiophene, tris(2-(2,4-difluorophenyl) pyridinate) iridium(III), bis(2-(2,4-difluorophenyl) pyridinate) picolinic acid iridium(III), tris(3,4,7,8-tetramethyl-1,10-phenantrolinato) iridium(III), or tris(2,9-dimethyl-4,7-diphenyl-1,10-phenantrolinato) iridiun(III), may be used for the blue fluorescent transparent substance 23.

Table 1 shows the optical characteristics of PMMA (poly methyl methacrylate), PC (polycarbonate), COP (cycloolefin polymer), PET (polyethylene terephthalate), and TAC (triacetyl cellulose). These transparent resins are examples of resins suitable for preparing the transparent member 30.

TABLE 1

| | Optical Characteristics | PMMA | PC | COP | PET | TAC |
|---|---|---|---|---|---|---|
| Weight | Specific gravity | 1.17-1.2 | 1.2 | 1.01-1.08 | 1.4 | 3 |
| Optical isotropy | Birefringence [nanometers] | <20 | <90 | <20 | — | — |
| Transparency | Light transmissibility [%] | 93 | 89 | 91-93 | 89 | 92 |
| Dimension stability | Contraction percentage [%] | 0.3-0.7 | 0.5-0.7 | 0.5-0.7 | — | — |
| Burning resistance | Linear expansion coefficient [1/Kelvin] | $7 * 10^{-5}$ | $7 * 10^{-5}$ | $7 * 10^{-5}$ | $1.5 * 10^{-5}$ | — |
| | Glass-transition temperature [degrees Celsius] | 93 | 150 | 120-165 | — | — |
| | Deflection temperature under load [degrees Celsius] | 74-99 | 121-140 | 110-162 | — | — |
| Flexure strength | Bending strength [MPa] | 140 | 100 | 80-135 | — | — |
| Water absorbability | Water absorption coefficient [%] | 0.3 | 0.15 | <0.01 | 0.4 | 7 |
| Dielectric constant | Relative permittivity | 2.6 | 3 | 2.3 | 3.2 | — |
| Surface hardness | Pencil hardness | 3H | 2B-B | H | H | — |

As shown in FIG. 2, the light guide structure 10 may be provided with a reflection layer 50 arranged on a back surface 33 of the transparent member 30. Due to the red, green, and blue fluorescent transparent substances 21, 22, and 23 emitting the light 21R, 22б, and 23B in all directions, the light 21R, 22G, and 23B reaches the reflection layer 50 and is then reflected from the reflection layer 50 toward a light emission surface 34 of the transparent member 30. In this way, the reflection layer 50 approximately doubles the luminance at the light emission surface 34. The reflection layer 50 may have a mirrored surface. The mirrored surface may be formed by metal deposition, including but not limited to being formed by aluminum deposition.

FIG. 3 shows excitation spectra of the red, green, and blue fluorescent transparent substances 21, 22, and 23 in accordance with an embodiment of the present disclosure. In FIG. 3, reference number 301 denotes an excitation spectrum of europium tri-n-butyl phosphate complex used as the red fluorescent transparent substance 21; reference number 302 denotes an excitation spectrum of terbium tri-n-butyl phosphate complex used as the green fluorescent transparent substance 22; and reference number 303 denotes an excitation spectrum of 9,10-dibromoanthracene used as the blue fluorescent transparent substance 23. Among the fluorescent transparent substances 21, 22, and 23, the red fluorescent transparent substance 21 may emit the red light 21R in response to ultraviolet light with a wavelength of 396 nanometers (corresponding to the first wavelength); the green fluorescent transparent substance 22 may emit the green light 22G in response to ultraviolet light with a wavelength of 352 nanometers (corresponding to the second wavelength); and the blue fluorescent transparent substance 23 may emit the blue light 23B in response to ultraviolet light with a wavelength of 403 nanometers (corresponding to the third wavelength).

By changing an intensity of the light 41R, 42G, and 43B of the first, second, and third wavelengths to excite the fluorescent transparent substances 21, 22, and 23 respectively, the illuminating device 100 can change the color produced by the combination of the light 21R, 22G, and 23B. In other words, the illuminating device 100 may serve as a color-tunable illuminating device. Also, this may allow the illuminating device 100 to change its emission intensity. Furthermore, since the light 41R to excite the red fluorescent transparent substance 21 cannot be absorbed by the green and blue fluorescent transparent substances 22 and 23; the light 42G to excite the green fluorescent transparent substance 22 cannot be absorbed by the red and blue fluorescent transparent substances 21 and 23; and the light 43B to excite the blue fluorescent transparent substance 23 cannot be absorbed by the red and green fluorescent transparent substances 21 and 22, loss of a light emission efficiency of the illuminating device 100 can be minimized.

In one non-limiting aspect of the present disclosure, a transparent fluorescent substance for white light emission can be manufactured by: providing at least one red fluorescent transparent substance 21 capable of being excited at the first excitation wavelength; providing at least one green fluorescent transparent substance 22 capable of being excited at the second excitation wavelength; providing at least one blue fluorescent transparent substance 23 capable of being excited at the third excitation wavelength; and combining the red, green, and blue fluorescent transparent substances 21, 22, and 23 to form a mixture of the red, green, and blue fluorescent transparent substances 21, 22, and 23 that emits white light in response to applied light of the first, second, and third excitation wavelengths.

In another non-limiting aspect of the present disclosure, white light can be generated by: emitting the light 41R of the first wavelength from the first light source 41; emitting the light 42G of the second wavelength from the second light source 42; emitting the light 43B of the third wavelength from the third light source 43; and guiding the light 41R, 42G, and 43B of the first, second, and third wavelengths to the light guide structure 10.

EXAMPLES

Example 1

Preparation of Red Fluorescent Transparent Substance

Tri-n-butyl phosphate complex, serving as the europium complex used for the red fluorescent transparent substance 21, was prepared according to the following procedure. Europium ions were extracted in hexane by adding n-tributyl phosphate and hexane to an aqueous solution of a water-soluble europium salt, such as europium nitrate, followed by vigorous shaking. Due to the fact that tri-n-butyl phosphate includes n-butyl serving as a lipophilic group and phosphoric acid serving as to water-soluble group to be coordinated to the europium ions, the europium complex formed as a result of the phosphoric acid being coordinated to the europium ions in the water solution was extracted in the hexane in the organic phase. In as glass container, 12 grams of concentrated nitric acid (with a concentration of 60 wt % by weight and a specific gravity of 1.38) was added to 6 grams of europium oxide to prepare a europium nitrate solution. When mixed with concentrated nitric acid, europium oxide dissolved due to the heat of the ensuing reaction and produced colorless, transparent, highly concentrated europium nitrate. Tri-n-butyl phosphate (27 grams) and hexane (30 grams) were added to this europium nitrate solution, which was then shaken vigorously for one minute to extract the europium ions from the water phase into the organic phase. After the water phase was removed, the hexane was evaporated with an evaporator to produce the red fluorescent transparent substance 21 in which the phosphate group was coordinated to the europium ions.

Example 2

Preparation of Green Fluorescent Transparent Substance

Tri-n-butyl phosphate complex, serving as the terbium complex used for the green fluorescent transparent substance 22, was prepared according to the following procedure. As with the europium complex, terbium ions were extracted in hexane by adding n-tributyl phosphate and hexane to an aqueous solution of a water-soluble terbium salt, such as terbium nitrate, followed by vigorous shaking. In a glass container, 12 grams of concentrated nitric acid (with as concentration of 60% by weight and a specific gravity of 1.38) was added to 6 grams of terbium oxide to prepare a terbium nitrate solution. The mere addition of concentrated nitric acid did not cause the terbium oxide to react; therefore, the terbium nitrate solution was stirred while being heated on a hot plate at a temperature of about 150 degrees Celsius to dissolve such terbium nitrate solution into the concentrated nitric acid, thus producing colorless, transparent, highly concentrated terbium nitrate. Tri-n-butyl phosphate (26 grams) and hexane (30 grams) were added to this terbium nitrate solution, which was then shaken vigorously for one minute to extract the terbium ions from the water phase into the organic phase. After the water phase was removed, the hexane was evaporated with an evaporator to produce the green fluorescent transparent substance 22 in which the phosphate group was coordinated to the terbium ions.

Example 3

Preparation of Blue Fluorescent Transparent Substance

For the blue luminous organic dye, 0.1 grams of commercially available 9,10-dibromoanthracene was dissolved in 29.4 grams of tri-n-butyl phosphate to prepare a $10^{-2}$ M solution. Next, 0.3 grams of this solution was dissolved in 29.1 grams of tri-n-butyl phosphate to prepare a $10^{-4}$ M solution of the blue fluorescent transparent substance 23.

Example 4

Preparation of Light Guide Structure 12 grams of a white fluorescent transparent substance was prepared by mixing 4 grams of the red fluorescent transparent substance 21 prepared through Example 1, 4 grams of the green fluorescent transparent substance 22 prepared through Example 2, and 4 grams of the blue fluorescent transparent substance 23 prepared through Example 3. Hardening agent benzoyl peroxide (0.14 grams) was added to 70 grams of methyl methacrylate monomer (MMA), and these were mixed with 12 grams of the prepared white fluorescent transparent substance. When mixed, the white fluorescent transparent substance remained transparent and did not cause any phase separation or white turbidity in the MMA. The white fluorescent transparent substance was poured into a closed container and heated at a temperature of about 80 to about 90 degrees Celsius to decompose the benzoyl peroxide, and methylmethacrylate was polymerized by radical polymerization so as to prepare polymethyl methacrylate (PMMA) containing the white fluorescent transparent substance. The temperature increased during polymerization due to the heat generated by the radical reaction. The boiling point of the MMA is about 101 degrees Celsius and, above this temperature, boiling occurred and bubbles were generated. It was, therefore, desirable to keep the temperature at about 80 to about 90 degrees Celsius after the MMA polymerization started and the liquid became viscous.

Example 5

Color Tuning

A light-emitting diode configured to emit ultraviolet light having a wavelength of 396 nanometers was used as the first light source 41, as light-emitting diode configured to emit ultraviolet light having a wavelength of 352 nanometers was used as the second light source 42, and a light-emitting diode configured to emit ultraviolet light having a wavelength of 403 nanometers was used as the third light source 43. In FIG. 4, reference number 401 denotes a light emission spectrum of the illuminating device 100 in the case where only the first light source 41 emitted ultraviolet light having a wavelength of 396 nanometers. Reference number 402 denotes a light emission spectrum of the illuminating device 100 in the case where only the second light source 42 emitted ultraviolet light having a wavelength of 352 nanometers. Reference number 403 denotes a light emission spectrum of the illuminating device 100 in the case where only the third light source 43 emitted ultraviolet light having a wavelength of 403 nanometers. Turning now to FIG. 5, reference number 501 denotes a chromaticity point showing a purplish red color in the case where only the in light source 41 emitted ultraviolet light having a wavelength of 396 nanometers. Reference number 502 denotes a chromaticity point showing a green color in the case where only the second light source 42 emitted ultraviolet light having a wavelength of 352 nanometers. Reference number 503 denotes a chromaticity point showing a blue color in the case where only the third light source 43 emitted ultraviolet light having a wavelength of 403 nanometers. Reference number 500 denotes a chromaticity point showing a white color in the case where a ratio of an emission intensity of the first, second, and third light sources 41, 42, and 43 was adjusted to 40:55:5.

As shown in FIG. 6, white color may be defined as having color temperatures ranging from about 2500 kelvin to about 15000 kelvin within a black body radiation curve. In a more specific sense, the white color may be defined as having color temperatures ranging from about 5500 kelvin to about 8500 kelvin. This color temperature range would be expected to have a 50% probability of being recognized as white color. As shown in Table 2, as color deviation of white color may be defined within plus or minus 0.002 uv.

TABLE 2

| Color Temperature | Color Deviation | CIE Color Point |
| --- | --- | --- |
| 15000 kelvin | +0.02 uv | (0.244, 0.284) |
|  | 0 | (0.265, 0.265) |
|  | −0.02 uv | (0.277, 0.247) |
| 8500 kelvin | +0.02 uv | (0.279, 0.326) |
|  | 0 | (0.290, 0.298) |
|  | 0.02 uv | (0.300, 0.273) |
| 5500 kelvin | +0.02 uv | (0.332, 0.383) |
|  | 0 | (0.332, 0.340) |
|  | −0.02 uv | (0.332, 0.305) |
| 2500 kelvin | +0.02 uv | (0.520, 0.484) |
|  | 0 | (0.475, 0.412) |
|  | −0.02 uv | (0.443, 0.357) |

In order for the illuminating device 100 to emit white light, a ratio of the red fluorescent transparent substance 21 to a combination of the red, green, and blue fluorescent transparent substances 21, 22, and 23 may be greater than about 25% but less than about 65% by weight; a ratio of the green fluorescent transparent substance 22 to the combination of the red, green, and blue fluorescent transparent substances 21, 22, and 23 may be greater than about 20% but less than about 60% by weight; and a ratio of the blue fluorescent transparent substance 23 to the combination of the red, green, and blue fluorescent transparent substances 21, 22, and 23 may be greater than 0% but less than about 40% by weight. The ratio of each of the red, green, and blue fluorescent transparent substances 21, 22, and 23 to the combination of the red, green, and blue fluorescent transparent substances 21, 22, and 23 may not be limited to the above-mentioned ranges. Regardless of whether the ratio of each of the red, green, and blue fluorescent transparent substances 21, 22, and 23 to the combination of the red, green, and blue fluorescent transparent substances 21, 22, and 23 falls within the above mentioned ranges, a desired color (for example, a white color) can be obtained by adjusting a ratio of an emission intensity of the first, second, and third light sources 41, 42, and 43. In particular, the ratio of the blue fluorescent transparent substance 23 to the combination of the red, green, and blue fluorescent transparent substances 21, 22, and 23 may be greater than 0% in order for the illuminating device 100 to emit blue light.

Example 6

Resin Casting

The transparent member 30 may be prepared through a resin casting process, for example, by adding a methyl methacrylate monomer to a mixture of the red, green, and blue fluorescent transparent substances 21, 22, and 23 and then polymerizing the methyl methacrylate monomer so as to produce the transparent member 30. When polymerizing the methyl methacrylate monomer, a polymer solidification process may be carried out, with the methyl methacrylate monomer being sandwiched between two glass plates, so as to produce the transparent member 30.

Example 7

Continuous Casting

The transparent member 30 may be prepared through a continuous casting process, for example, by adding a methyl methacrylate monomer to a mixture of the red, green, and blue fluorescent transparent substances 21, 22, and 23 and then polymerizing the methyl methacrylate monomer so as to produce the transparent member 30. When polymerizing the methyl methacrylate monomer, a polymer solidification process may be carried out, with the methyl methacrylate monomer being sandwiched between two belts, arranged one above the other, while rotating the two belts slowly so as to produce the transparent member 30. Each of the two belts may be made of polished stainless steel.

Example 10

Solution Casting

The transparent member 30 may be prepared through a solution casting process, for example, by adding a poly methyl methacrylate solution to a mixture of the red, green, and blue fluorescent transparent substances 21, 22, and 23 and then evaporating a solvent from the poly methyl methacrylate solution so as to produce the transparent member 30. For example, chloroform, tetrachloroethane, dichloromethane, tetrahydrofuran, or cyclohexanone may be used for the solvent to dissolve the poly methyl methacrylate. When evaporating the solvent, heat may be applied to the poly methyl methacrylate solution applied to a casting drum or a smoothly-shaped belt made of stainless steel.

Example 11

Extrusion Process

The transparent member 30 may be prepared through an extrusion process, for example, by combining a mixture of the red, green, and blue fluorescent transparent substances 21, 22, and 23 with a dissolved methyl methacrylate polymer so as to produce the transparent member 30. An extruder may combine the dissolved methyl methacrylate polymer with the mixture and then eject the methyl methacrylate polymer combined with the mixture from its T-shaped outlet. Next, the methyl methacrylate polymer combined with the mixture may be cooled so as to become solidified.

While the present disclosure has been described with respect to a limited number of embodiments, a person skilled in the art, having the benefit of this disclosure, would appreciate that other embodiments can be devised which do not depart from the scope of the present disclosure as disclosed herein. Accordingly, the scope of the invention should be limited only by the attached claim.

The invention claimed is:

1. An illuminating device, comprising:
a light guide structure that includes a transparent member, the transparent member comprising at least one red fluorescent transparent substance, at least one green fluorescent transparent substance, and at least one blue fluorescent transparent substance;
a first light source configured to emit light of a first wavelength to excite the at least one red fluorescent transparent substance;
a second light source configured to emit light of a second wavelength to excite the at least one green fluorescent transparent substance, wherein the green fluorescent transparent substance includes a terbium complex; and
a third light source configured to emit light of a third wavelength to excite the at least one blue fluorescent transparent substance, wherein a ratio of the at least one blue fluorescent transparent substance to a combination of the red, green, and blue fluorescent transparent substances is less than about 40% by weight, and wherein the at least one blue fluorescent transparent substance comprises 9,10-dibromoantbracene,
wherein the illuminating device is a color-tunable illuminating device configured to adjust a ratio of an emission intensity of the first, second and third light sources in order to enable the light guide structure to emit a specific white light having a uniform luminance distribution.

2. The illuminating device of claim 1, wherein the first wavelength, the second wavelength, and the third wavelength are different from one another.

3. The illuminating device of claim 1, wherein the at least one red fluorescent transparent substance, the at least one green fluorescent transparent substance, and the at least one blue fluorescent transparent substance are combined to enable the transparent member to emit white light in response to the light of the first, second, and third wavelengths.

4. The illuminating device of claim 1, wherein the at least one red fluorescent transparent substance includes a europium complex.

5. The illuminating device of claim 4, wherein the europium complex includes a europium ion and at least one chemical compound that comprises a phosphate group coordinated to the europium ion.

6. The illuminating device of claim 5, wherein the chemical compound that comprises a phosphate group is selected from the group including: trimethyl phosphate, triethyl phosphate, tri-n-butyl phosphate, triphenyl phosphate and tritolyl phosphate.

7. The illuminating device of claim 1, wherein the terbium complex includes a terbium ion and at least one chemical compound that comprises a phosphate group coordinated to the terbium ion.

8. The illuminating device of claim 7 wherein the chemical compound that comprises a phosphate group is selected from the group including: trimethyl phosphate, triethyl phosphate, tri-n-butyl phosphate, triphenyl phosphate and tritolyl phosphate.

9. The illuminating device of claim 1, further comprising a reflection layer arranged on one side of the transparent member.

10. The illuminating device of claim 1, wherein
a ratio of the at least one red fluorescent transparent substance to a combination of the red, green, and blue fluorescent transparent substances is greater than about 25% but less than about 65% by weight; and
a ratio of the at least one green fluorescent transparent substance to the combination of the red, green, and blue fluorescent transparent substances is greater than about 20% but less than about 60% by weight.

11. A light guide structure, comprising:
a transparent member comprising at least one red fluorescent transparent substance capable of being excited at a first excitation wavelength, at least one green fluorescent transparent substance capable of being excited at a second excitation wavelength, wherein the green fluorescent transparent substance includes a terbium complex including a terbium ion and at least one chemical compound having a phosphate group coordinated to the terbium ion, and at least one blue fluorescent transparent substance capable of being excited at a third excitation wavelength, wherein:
the at least one red fluorescent transparent substance, the at least one green fluorescent transparent substance, and the at least one blue fluorescent transparent substance are uniformly mixed throughout the transparent member such that the light guide structure is enabled to emit white light having a uniform luminance distribution;
the at least one blue fluorescent transparent substance is 9,10-Dibromoanthracene, and wherein a ratio of the at least one blue fluorescent transparent substance to a combination of the red, green, and blue fluorescent transparent substances is less than about 40% by weight; and
one or more light sources are arranged on a side edge of the transparent member to enable the light guide structure to guide light emitted from the one or more light sources to an opposite side edge of the transparent member such that the at least one red fluorescent transparent substance, the at least one green fluorescent transparent substance, and the at least one blue fluorescent transparent substance are excited, wherein a ratio of an emission intensity of the one or more light sources is adjustable in order to enable the light guide structure to emit, a specific white light.

12. The light guide structure of claim 11, wherein the at least one red fluorescent transparent substance, the at least one green fluorescent transparent substance, and the at least one blue fluorescent transparent substance are combined to form a mixture that enables the transparent member to emit the white light in response to applied light of the first, second, and third excitation wavelengths.

13. The light guide structure of claim 12, the transparent member further comprising:
a monomer added to the mixture and polymerized to form the transparent member.

14. The light guide structure of claim 12, the transparent member further comprising:
a polymer solution added to the mixture, wherein a solvent is evaporated from the polymer solution to form the transparent member.

15. The light guide structure of claim 12, the transparent member further comprising:
a dissolved polymer added to the mixture to form the transparent member.

16. The light guide structure of claim 11, wherein
a ratio of the at least one red fluorescent transparent substance to a combination of the red, green, and blue fluorescent transparent substances is greater than about 25% but less than about 65% by weight; and
a ratio of the at least one green fluorescent transparent substance to the combination of the red, green, and blue fluorescent transparent substances is greater than about 20% but less than about 60% by weight.

* * * * *